United States Patent [19]

Churma et al.

[11] Patent Number: 4,675,364

[45] Date of Patent: Jun. 23, 1987

[54] MODIFICATION OF ETHYLENE VINYL ACETATE COPOLYMER

[75] Inventors: Theodore Churma, Berwyn; Elwood D. Latimer, Jr., Naperville; Stephen J. Vicik, Darien, all of Ill.

[73] Assignee: Viskase Corporation, Chicago, Ill.

[21] Appl. No.: 701,232

[22] Filed: Feb. 13, 1985

Related U.S. Application Data

[62] Division of Ser. No. 495,656, May 18, 1983.

[51] Int. Cl.$^4$ ............................................. C08F 6/26
[52] U.S. Cl. ................................. 525/387; 525/330.3
[58] Field of Search ............................. 525/330.3, 387

[56] References Cited

U.S. PATENT DOCUMENTS

| 4,015,058 | 3/1977 | Schober | 525/330.3 |
| 4,025,706 | 5/1977 | Schober | 525/330.3 |
| 4,156,062 | 5/1979 | Pritchett | 525/366 |
| 4,171,338 | 10/1979 | Mason | 264/211 |
| 4,221,699 | 9/1980 | Arnaud et al. | 525/346 |

OTHER PUBLICATIONS

CA 96(4):20910g, "Modified Ethylene Polymers" Gebauer, et al., Aug. 19, 1981.

Primary Examiner—Joseph L. Schofer
Assistant Examiner—Bernard Lipman
Attorney, Agent, or Firm—John C. LeFever

[57] ABSTRACT

The melt index is reduced and the rheology is modified in ethylene-vinyl acetate copolymers used in the manufacture of films, by the addition of a crosslinking agent to the copolymer. This allows the use of more readily available raw materials and improves the stability of the bubble during stretching of tubular films.

1 Claim, No Drawings and heated to its extrusion temperature of between about 150° C. and about 200° C., preferably about 177° C. (350° F.), and extruded through an annular die. After extrusion, the film is then stretched by inflation, as explained herein, to impart the heat-shrinkable property to the film.

In the practice of the invention, the crosslinking agent is introduced in such a manner as to become reactive at the temperature at which the EVA copolymer is extruded. This is preferably done by introducing the crosslinking agent into the solid, pelletized copolymer feed. The crosslinking agent used should be essentially unreactive at the temperatures at which the crosslinking agent containing feed is formed and stored. A suitable crosslinking agent is one that is reactive with EVA copolymers at the temperature at which the EVA copolymer is extruded, between about 150° C. and about 200° C., preferably about 177° C. (350° F.), but which is essentially unreactive or shows little decomposition at a temperature needed to melt the resin and form the concentrate, which is between about 93° C. (200° F.) and about 107° C. (225° F.). By "unreactive" is meant that an insignificant amount of crosslinking agent will decompose in 5 minutes. By "reactive" is meant that a significant portion of the crosslinking agent will decompose within 3 minutes. The crosslinking agent in the feed becomes reactive as the EVA copolymer is heated to its extrusion temperature and the desired melt index and rheological property modification are realized.

The crosslinking agent is preferably introduced by the preparation of a "concentrate" of the crosslinking agent in a base resin, and mixing the pelletized or ground concentrate into the EVA copolymer feed at an amount such that when the feed is melted and mixed in the extruder, the desired concentration of crosslinking agent is achieved.

The crosslinking agent is used in the EVA copolymer in an effective amount. The effective amount is defined as an amount that is sufficient to react with the EVA copolymer to result in the rheology modification and melt index reduction as herein described. The particular amount depends on the reactivity of the crosslinking agent used. When the preferred crosslinking agent, 2,5-dimethyl-2,5-bis(t-butylperoxy)hexane (DBH), is used, the crosslinking agent is preferably present in an amount of about 0.005 wt. % to about 0.015 wt. %, preferably about 0.00625 wt. %, based on the total weight of the resin conveyed to the extruder.

As described above, a preferred method for introducing the crosslinking agent into the EVA copolymer during extrusion is to provide a concentrate of the crosslinking agent in a compatible polymer and to mix this concentrate into the EVA copolymer feed. The base polymer used to form the concentrate should be a polymer that is compatible with an ethylene vinyl acetate copolymer. By compatible is meant a polymer that is dispersible in the EVA resin being used. Such polymers are well known in the art and include ethylene vinyl acetate copolymers, and polyethylene polymers. The concentrate can be made by mixing the crosslinking agent into a compatible polymer. The preferable method for making a concentrate is by adding the crosslinking agent to a fluxed or melted base polymer. Preferably the crosslinking agent is added by dissolving it in a solvent to improve the dispersion of the crosslinking agent in the concentrate. Suitable solvents are those that are evaporated during the mixing of the copolymer and the crosslinking agent and include alcohols having a boiling point below about 90° C., such as isopropyl alcohol, and other similar low-boiling solvents in which the crosslinking agent is soluble and substantially nonreactive. The melted base polymer and the crosslinking agent are then mixed while maintaining a temperature in which the crosslinking agent does not significantly decompose. For 2,5-dimethyl-2,5-bis(t-butylperoxy)hexane this temperature is from about 200° F. (93° C.) to about 225° F. (107° C.). The copolymer and the crosslinking agent can be mixed in any appropriate device known in the art, such as a two roll mill. After mixing the resulting composition can then be formed into sheets, cooled, and ground, by conventional methods known in the art, to form a pelletized or ground concentrate.

The concentration of the crosslinking agent in the concentrate depends on the desired final concentration in the EVA copolymer which is extruded and the "letdown ratio". The "letdown ratio" is the ratio at which the EVA copolymer and the concentrate are mixed. The concentration of the crosslinking agent in the concentrate is not highly critical but it must be such that when mixed, the crosslinking agent will be adequately dispersed. In general, the concentration of the crosslinking agent should be about 0.5 weight percent or less, based on the total weight of the concentrate. For economic reasons it is preferable that the concentration not be less than 0.17 weight percent. More preferably, the concentration is about 0.25 weight percent. The letdown ratio is not critical, but higher letdown ratios are preferred for economic reasons, since the amount of concentrate that is handled is reduced. The concentrate and EVA copolymer feed are mixed in their ground or pelletized form and are then extruded together to obtain the desired final concentration of crosslinking agent in the final mixture being extruded. With a concentration of the crosslinking agent of about 0.25 weight percent in the concentrate and a desired final concentration of about 0.00625 weight percent in the total resin being extruded, the letdown ratio is about 39:1.

The extruder used should be of a type such that the concentrate and the EVA copolymer are adequately mixed to provide a uniform dispersion of the crosslinking agent in the extruding mixture. Suitable extruders are those of a mixing type, such as a screw extruder with a mixing screw.

The EVA copolymer used in the present invention can be any ethylene vinyl acetate copolymer useful in extrusion of films and the like, provided that the melt index of the EVA copolymer be less than about 0.75. There are many EVA copolymers available having a melt index above about 0.4. By practice of the invention, it is possible to obtain copolymers having a melt index of 0.25. Thus it is possible to use the more readily available high melt index materials and have the advantages of a low melt index material, which is not commercially available in a wide range of vinyl acetate content.

Typically, the vinyl acetate content of the EVA copolymer useful in the invention is less than about 30 weight percent and greater than about 4 weight percent.

The films manufactured according to the invention can be prepared by any of the known methods in the art for extruding films. A suitable method for extruding single layer or multilayer films that have a plurality of layers is disclosed in U.S. Pat. No. 3,354,506, issued Nov. 23, 1967 to G. Raley. The stretching to achieve

MODIFICATION OF ETHYLENE VINYL ACETATE COPOLYMER

This application is a division of prior U.S. application Ser. No. 495,656 filed May 18, 1983.

The present invention relates to the use of a chemical crosslinking agent for the reduction of the melt index and for the modification of the rheology of ethylene vinyl acetate copolymers. These copolymers are used in the manufacture of polymeric films, and by practice of the invention, the ease of manufacture of these films is increased.

Ethylene vinyl acetate (EVA) copolymers are used in a great variety of films, generally with layers of other polymeric materials to form multilayer films of varied properties. Ethylene vinyl acetate copolymers are, for example, used in films that are heat shrinkable. These films are stretched during manufacture in such a way that they shrink upon heating. EVA copolymers are useful in such films because they can be extruded to form films, they have good adhesive properties for adhering to other film layers in multilayer films, and they can be easily stretched in a manner to form heat shrinkable films. Examples of films using ethylene vinyl acetate copolymers include films suitable for use in the packaging of primal meat, such as those described in U.S. Pat. Nos. 4,207,363, issued June 10, 1980 to S. Lustig and J. Anthony, 4,296,156 issued Oct. 20, 1981 to S. Lustig and S. J. Vicik, and Canadian Patent No.982,923 issued Feb. 3, 1976 to S. Lustig and J. Anthony. Other examples include films suitable for the packaging of poultry, such as U.S. Pat. Nos. 4,196,240, issued Apr. 1, 1980 to S. Lustig and W. Kohler, 4,156,749, issued May 29, 1979 to S. Lustig and S. Vicik, 4,188,350, issued Feb. 12, 1980 to S. Vicik, W. Kohler, and J. Funderburk, Jr., and 3,900,635 issued Aug. 19, 1975 to J. Funderburk, Jr., and S. Vicik.

In the manufacture of heat shrinkable films having an EVA copolymer layer, the melt index of the EVA copolymer is a critical factor. Typically, in the manufacture of heat shrinkable films, the film layers are melt extruded through an annular die to form a tube which is then stretched at the draw temperature of the film to obtain the heat shrinkable property. The stretching is typically accomplished by inflating an extruded tube film with a gas to form a "bubble" in the tube. If the melt index of the EVA copolymer is too high, this bubble can become unstable and the film becomes difficult to stretch. Therefore, it is often necessary to use EVA copolymers having a relatively low melt index. The most readily available EVA copolymers typically have a melt index above about 0.4, but for best bubble stability, a melt index lower than about 0.4, preferably about 0.25, is desirable. EVA copolymers having such a low melt index typically are not generally available in a wide range of vinyl acetate contents. It would be desirable, therefore, to use more readily available EVA copolymers that have a relatively higher melt index, and still retain good bubble stability.

An object of the invention, therefore, is to provide a method for the manufacture of films containing EVA copolymers having a melt index which is higher than was previously possible.

Another object is to ease the manufacture of films wherein a high melt-index EVA copolymer is used.

One aspect of the invention is in a process for manufacturing an extruded film having at least one layer of an ethylene vinyl acetate copolymer, wherein the copolymer is melted, extruded through a die, and stretched; the improvement comprising the presence of an effective amount of a crosslinking agent in the melted copolymer during extrusion of the ethylene vinyl acetate copolymer.

Another aspect of the invention is in a stretchable film having at least one layer of ethylene vinyl acetate copolymer and manufactured by a process wherein the copolymer is melted, extruded through a die, and stretched; the improvement comprising the presence of an effective amount of a crosslinking agent in the melted copolymer slinking agent in the melted copolymer during extrusion of the ethylene vinyl acetate copolymer.

It has been found that the incorporation of a small amount of a crosslinking agent, such as an organic peroxide, in the EVA copolymer enables one to extrude the EVA copolymer into a film which has a lowered melt index. This allows the use of a wider range of EVA copolymers than was previously possible by including the use of "high" melt index EVA copolymers. The addition of a crosslinking agent also improves the rheological properties of the EVA copolymer, such that the stability of the bubble during the stretching of the film is increased. It is now possible, therefore, to have more flexibility in the process conditions in the manufacture of the film, and to use a greater variety of EVA copolymers.

Crosslinking agents, such as organic peroxides, have been used to crosslink polyethylene polymers and copolymers. In the process of the present invention, however, there is essentially no detectable crosslinking in the copolymer, the major effect of the reaction of the crosslinking agent with the copolymer being the reduction of the melt index and the modification of the rheology of the molten copolymer as it is extruded. Thus, the crosslinking agents, as used in the present invention, are essentially rheology modification agents, and melt index reduction agents, and do not react with the polymer to form a solid or highly viscous crosslinked copolymer.

This effect of the addition of a chemical crosslinking agent is unexpected and surprising. The reaction of the crosslinking agent and the EVA copolymer as it occurs in the invention is not completely understood. It is unexpected that a crosslinking type of agent can be added to an EVA copolymer to achieve a reaction that does not crosslink the copolymer in a localized fashion and that can be controlled. It is unknown in the art that the addition of a chemical crosslinking agent to an EVA copolymer in an amount that does not form gels improves the rheological properties of the copolymer, and improves the stability of the bubble during stretching.

Crosslinking in polymers can be demonstrated by their insolubility in solvents, such as xylene, and EVA copolymers prepared according to the present invention have been found to be soluble.

Preferably, the crosslinking agents used in EVA copolymers are organic peroxides. The preferred organic peroxide for use in the invention is 2,5-dimethyl-2,5-bis(t-butylperoxy)hexane (DBH). The 2,5-dimethyl-2,5-bis(t-butylperoxy)hexane is preferred because it is approved in the United States and other countries for use in films used for packaging food products, and because of its favorable reaction properties.

Typically, in the manufacture of films having an EVA copolymer layer, a suitable EVA copolymer, generally in the form of pellets or the like, is advanced into a heating zone wherein the copolymer is melted the heat shrinkable property can be accomplished by any of the known methods for making heat shrinkable polyethylene-type films. A preferred method for stretching the films of the invention is the so-called "double-bubble" method, as for example, the method disclosed in U.S. Pat. No 3,555,604, issued Jan. 19, 1971 to H. E. Pahlke. In this method a primary tubing is first formed by melting and heating the polymer to the extrusion temperature and extruding it through an annular die. A plurality of layers can be extruded, as described in the above United States patents, to form a multiply film. The primary tube is inflated by the admission of air, cooled, collapsed, and then reinflated to form an isolated second bubble. The inflated tubing is advanced through a heating zone to raise the film to its draw temperature. The draw temperature is that temperature at which the film becomes drawable and at which it can be radially expanded. In a draw or expansion zone, the tubing is radially expanded by inflation to provide the transverse stretching of the film. The expansion of the tubing is accompanied by a sharp, sudden reduction of thickness at the draw point. Simultaneously, the film is stretched longitudinally by a pair of nip rolls to provide the stretching in the machine direction. This stretching of the film in both the transverse direction and the machine direction imparts the heat shrinkable property to the film.

The following examples illustrate the invention and are not intended to limit it in any way.

The EVA copolymers (EVA) and the low density polyethylene polymers (LDPE) identified in Table A were used in the examples. Also listed in Table A are the tradename, source, the melt index of each polymer, the weight percent of vinyl acetate in the EVA copolymers, and the density in grams per cubic centimeter of the the LDPE polymers. The designation (D) indicates availability from E. I. duPont deNemours & Co., Wilmington, Del., the designation (S) indicates availability from U.S.I. Chemicals, National Distillers & Chemical Corporation, New York, N.Y., and the designation (U) indicates availability from Union Carbide Corporation, Danbury, Conn. "Alathon" and "Ultrathene" are trademarks.

TABLE A

| Polymer | Tradename | VA wt. % | MI |
|---|---|---|---|
| EVA-A | Alathon 3135(D) | 12.0 | 0.25 |
| EVA-B | Alathon 3120(D) | 7.5 | 1.2 |
| EVA-C | Alathon 3121(D) | 7.5 | 0.5 |
| EVA-D | Ultrathene UE657(S) | 12.0 | 0.5 |
| EVA-E | Ultrathene UE80200(S) | 12.0 | 0.25 |
| EVA-F | Ultrathene UE80174(S) | 9.0 | 0.5 |
| EVA-G | Ultrathene UE80479(S) | 4.5 | 0.2 |
| EVA-H | Ultrathene UE80159(S) | 12.0 | 0.58 |
| EVA-I | Alathon 3159(D) | 15.0 | 0.7 |
|  |  | Density |  |
| LDPE-A | DYNH-9(U) | 0.920 | 2.1 |
| LDPE-B | DXM-256(U) | 0.9225 | 3.0 |

In the following examples the concentrates were made, unless indicated otherwise, as follows; the 2,5-dimethyl-2,5-bis(t-butylperoxy)hexane was dissolved in an alcohol to make a 2% solution. The base polymer used for the concentrate was then melted on a two roll mill to form a melted sheet. The temperature of the melted resin was kept between about 93° C. (200° F.) and about 107° C. (225° F.), and the solution was slowly added to the melt in the two roll mill. The resin was then mixed in the two roll mill for about two minutes to disperse the organic peroxide in the polymer used as a base for the concentrate. During this time, the low boiling alcohol boiled away leaving only the organic peroxide dispersed throughout the resin. Enough organic peroxide was added to make the final concentration of organic peroxide in the resin at 0.25%, based on the total weight of the concentrate. After mixing, the material was sheeted from the mill, cooled, and then ground to produce the concentrate.

The following tests were used:

Melt Index-ASTM D-1238. The melt index is the amount of extrusion in grams in 10 minutes.

Tensile Strength-ASTM D-882. A sample 5.08 cm long and 2.54 cm wide was used.

The percent shrinkage was determined as follows:

Four machine direction samples of the film were prepared by cutting pieces of the film to 17.8 cm in the machine direction and 2.54 cm in the transverse direction. Four transverse direction samples were prepared by cutting pieces of the film to 17.8 cm in the transverse direction and 2.54 in the machine direction. Each sample was marked exactly 10 cm from one end. A paper clip was attached to the remaining 7.8 cm, and the samples were then held by gripping the sample with tongs by the paper clip. The samples were next dipped into a water bath at the temperature indicated in the examples. The samples were held under the surface of the bath for five seconds. After shrinkage, the distance (D) between the mark and the free end was measured in centimeters and the percent shrinkage was calculated by the formula;

% Shrinkage=(10−D)10.

EXAMPLE I

Concentrates were made as described in the general procedure above using 2,5-dimethyl-2,5-bis-(t-butylperoxy)hexane, available as "Lupersole 101" from Pennwalt Corp., Philadelphia, Pa. This is a liquid crosslinking agent and is reported as having a half-life in low density polyethylene of 13,080 min at 225° F. (107° C.) and 1.19 minutes at 375° F. (191° C.). The crosslinking agent was dissolved in isopropyl alcohol and was added to the fluxed EVA copolymer in a two-roll mill while maintaining the temperature of the fluxed material between about 200° F. (93° C.) and about 225° F. (107° C.). Each concentrate had a concentration of the crosslinking agent of about 0.25 wt. %. Thadded to the fluxed EVA copolymer in a two-roll mill while maintaining the temperature of the fluxed material between about 200° F. (93° C.) and about 225° F. (107° C.). Each concentrate had a concentration of the crosslinking agent of about 0.25 wt. %. The letdown ratio varied from 39 parts EVA copolymer to 1 part of concentrate, to 19 parts EVA copolymer to 1 part concentrate, to obtain the desired final concentration shown in Table B. Using these concentrates, a three-ply film with a first outer layer of EVA copolymer was made (55 wt. % of composite), using an apparatus and method described in the above-cited U.S. Pat. No. 3,354,506. The films also consisted of a core layer (20 wt. % of composite) of a vinylidene chloride, vinyl chloride copolymer (PVDC) formulated for use in films, and a second outer layer of EVA-I (25 wt. % of composite). In Table B are also shown the EVA copolymer used in the first outer layer of the film, the melt pressure in millions of Pascals, the bubble stability, the shrinkage in percent at about 90° C. (194° F.) in both the machine direction (MD) and the transverse direction (TD), and the tensile strength in millions of Pascals in the machine direction and the transverse direction. The term "Good Bubble Stability" is a descriptive phrase used to indicate a bubble with minimum pulsations and good stability with moderately changing conditions. In the case of Run E, it was found that only by the inclusion of crosslinking agent in the extrudate was it possible at all to form a bubble for stretching the tube.

TABLE B

| Run No. | EVA | wt. % CL | Melt Press. | Bubble Stability | Shrinkage MD/TD | TS MD/TD |
|---|---|---|---|---|---|---|
| A | EVA-A | Control | 46.9 | Good | 47/53 | 47./50. |
| B | EVA-A | 0.0062 | 47.6 | Excellent | 45/53 | 50./52. |
| C | EVA-A | 0.0083 | 48.3 | Excellent | 47/54 | 48./52. |
| D | EVA-A | 0.0125 | 51.0 | Excellent | 47/55 | 50./53. |
| E | EVA-H | Control | — | Unstable | — | — |
| F | EVA-H | 0.0062 | 45.5 | Excellent | 44/51 | 47./52. |
| G | EVA-H | 0.0083 | 48.0 | Excellent | 43/51 | 47./50. |

Table B demonstrates that the stability of the bubble used to stretch the film was improved, while the physical properties of the final film were unaffected. The rise in the melt pressure shown when the invention is practiced, indicates that there was an actual lowering of the melt index. This was verified by actual measurements of the melt index of base resins and films after extrusion. Films were made as described above, with and without the use of a crosslinking agent, and the base resins and the films were tested. The results are shown in Table C. Shown are the weight percent of crosslinking agent(CL) in the EVA copolymer and the melt index(MI).

TABLE C

| Run no. | Resin | | CL Wt. % | MI |
|---|---|---|---|---|
| G | EVA-H | (Base Resin) | 0 | 0.58 |
| H | EVA-H | (Film) | 0 | 0.74 |
| I* | EVA-H | (Film) | 0.0083 | 0.30 |
| J | EVA-D | (Base Resin) | 0 | 0.44 |
| K | EVA-D | (Film) | 0.00625 | 0.25 |

*I is the same as G in Table B.

The data in Table C clearly shows how through practice of the invention, the melt index of an EVA copolymer can be effectively lowered.

Samples from Run D and a sample made using DBH in EVA-D (Run No. L) were tested for crosslinking of the EVA copolymer. This was done by dissolving a sample of the resin to be tested in xylene, and determining the amount that dissolves. The amount of crosslinking can be determined by the percent of the sample that dissolves. The test used for determining the amount of crosslinking was ASTM, D-2765, "Standard Test Method For Degree of Crosslinking in Crosslinked Ethylene Plastics as Determined by Solvent Extraction". The results are shown in Table D.

TABLE D

| Run No. | % Soluble | Comment |
|---|---|---|
| D | 99.25 | No measurable crosslinking. |
| L | 99.72 | No measurable crosslinking. |
| Control | 100. | No crosslinking. |

The above results show that there is essentially no crosslinking present in the sample EVA copolymers containing a crosslinking agent, although the advantageous reduction of melt index was achieved and the bubble used to stretch the film had improved stability during film manufacture.

EXAMPLE II

Concentrates were made using three different polymers as a base. The crosslinking agent was the same as that used in Example I. The concentrates were made by adding the crosslinking agent to the polymer and mixing on a 2-roll mill at a concentration level of the crosslinking agent of 0.25 wt. %. Films were made, using these concentrates, essentially as in Example I with EVA-D as a first outer layer, PVDC as a core layer, and EVA-A as a second outer layer. The crosslinking agent was added to the first outer layer. The let down ratio was 39:1 and the concentration of the crosslinking agent in the extruded film was 0.00625 wt. %. The polymers used to make the concentrates were low density polyethylene, and low vinyl acetate content EVA copolymers. These were used in an attempt to reduce any localized crosslinking that may occur in the concentrate. This causes gels of crosslinked resin to appear in the primary tube, eventually leading to difficulty in stretching the film. The polymers used were EVA-A, EVA-B, and LDPE-B. The melt extrusion temperature was from about 160° C. (320° F.) to about 177° C. (350° F.). In Run A, gels began to appear in the primary tubing after 1½ hours, until after a time, the number of gels was so high that the primary tubing could not be stretched because of film breaks at the gels of polymer film. In Run B, the EVA copolymer extruded and stretched well. After 3¾ hours, the system was purged with EVA-A for 15 minutes, during which time the primary tubing was loaded with gels and clumps of crosslinked resin. In Run C, the EVA copolymer extruded and stretched well. After 3½ hours the system was easily purged with EVA-A, producing a 5 foot (1.5 meter) section of heavily gelled film.

Two concentrates were then made using a crosslinking agent diluted in methyl alcohol. To make each concentrate, a 2% solution of DBH in methyl alcohol was mixed into a polymer to form a concentrate of 0.125 wt. % crosslinking agent. The polymers used to form the two concentrates were EVA-A for run D and LDPE-A for run E. The concentrates were then extruded with EVA-D at a letdown ratio of 19:1 so that there was 0.00625 wt. percent crosslinking agent in the final film. Run D produced good results with only a slight melt pressure increase and very few gels. The run lasted for 1 hour and 20 minutes. Run E also produced good results similar to Run D. The run lasted for 1 hour. A similar concentrate was made (Run F). This was a longer 8 hour run. The concentrate was made similar to that for Run E except the amount of crosslinking agent in the concentrate was 0.25 wt. % and the letdown ratio was 39.1 to produce the same 0.00625 wt. % crosslinking agent in the final film. Run F produced good results with only a slight melt pressure increase over the 8 hour extrusion run and very few gels.

The results of the above runs are summarized in Table E below.

TABLE E

| Run | Conc. Base | Let Down | Gel Level |
|---|---|---|---|
| A* | EVA-B | 39:1 | High |
| B* | LDPE-B | 39:1 | High |
| C* | EVA-A | 39:1 | High |
| D** | EVA-A | 19:1 | Low |
| E** | LDPE-A | 19:1 | Low |
| F** | LDPE-A | 39:1 | Low |

*No diluent used.
**Alcohol diluent used.

Runs D, E and F demonstrate the preferable method, wherein the crosslinking agent is diluted in a solvent. This aids in the dispersion of the crosslinking agent and prevents localized crosslinking in the concentrate, thereby reducing or nearly eliminating gels in the primary tubing.

Tests were also run using different polymers in the concentrate and the effect on the number of gels in the primary bubble were noted. EVA-A and LDPE-A were used. It was found that LDPE-A made a better base resin because of its lower reactivity to the crosslinking agent.

EXAMPLE III

Three-layer films were made essentially as in Example I with a core or center layer of a copolymer, formulated for use in films, of vinylidene chloride and vinyl chloride. EVA-G was used for the two outer layers, with and without the organic peroxide concentrate added to the EVA layers. The concentrate was made as described earlier using a 2% solution of the organic peroxide in isopropyl alcohol with EVA-A as the resin used for the dispersion. Without the organic peroxide concentrate in the EVA-G polymer layers of the three layer coextruded tube, it was impossible to even start the stretching of the tube into a bubble shape. When the concentrate containing the organic peroxide was added to the outer EVA-G layer at a ratio of 1 part of concentrate to 39 parts of EVA-G polymer to make 0.00625 wt. % of the organic peroxide in the mixture, the resulting coextruded tube could be stretched and a bubble was formed.

EXAMPLE IV

Another extrusion run was made under the same conditions as Example II except that the EVA resin used was EVA-C. The same organic peroxide concentrate was used with the same final concentration of 0.00625 wt. % organic peroxide. The first combination tried had polymer EVA-C without the concentrate addition as the first outer layer (inside of tube) and polymer EVA-A as the second outer layer, (outside of tube). The core layer was the same as in Example I. This combination formed a coextruded tube that was hard to stretch and it produced an unstable bubble. The second combination tried was to add the concentrate (0.25 wt. %) to the polymer EVA-C at a ratio of one part to 39 parts to produce a final concentration of organic peroxide of 0.00625 wt. %, and then to use this polymer as both outer layers. The use of the organic peroxide in the polymers made the resulting coextruded tube easy to stretch and it produced a stable bubble.

A third combination duplicated the first combination, that is, EVA-A in the second outer layer and EVA-C in the first outer layer (inside of tube), except that the first outer layer contained the organic peroxide concentrate to produce a final concentration of 0.00625 wt. % organic peroxide in that layer. The core layer was the same as Example 1. The addition of the concentrate produced a coextruded tube that was easy to stretch and it formed a stable bubble. This differed from the same combination without the concentrate added, which produced a coextruded tube that was difficult to stretch due to an unstable bubble. A summary of these runs is given in Table F.

TABLE F

| Run No. | 1st Outer Layer (Inside of Tube) | 2nd Outer Layer (Outside of Tube) | Bubble Stability |
|---|---|---|---|
| 1 | EVA-C | EVA-A | Unstable |
| 2 | EVA-C + 0.00625% Perox. | EVA-C + 0.00625% Perox. | Stable |
| 3 | EVA-C + 0.00625% Perox. | EVA-A | Stable |

What is claimed is :

1. An extrudable mixture for manufacturing of extruded film having at least one layer of eithylene vinyl acetate copolymer, wherein the copolymer is melted, extruded through an annular die to form a tube, and stretched by radially expanding the tube by forming a bubble in the tube by gas inflation; which mixture comprisess a melted ethylene vinyl acetate copolymer having a melt index less than about 0.75, and
   a effective amount of 2.5-dimethyl-2,5-bis-t-butylperoxy hexane sufficent to lower the melt index of the mixture to less than about 0.4 and to modify the rheology of the ethylene vinyl acetate copolymer so as to improve the stability of the bubble, and insufficent to crosslink the ethylene vinyl acetate copolymer.

* * * * *